H. A. SELAH.
ALTERNATING CURRENT RECTIFIER.
APPLICATION FILED MAR. 29, 1915.
1,256,063.
Patented Feb. 12, 1918.
6 SHEETS—SHEET 1.
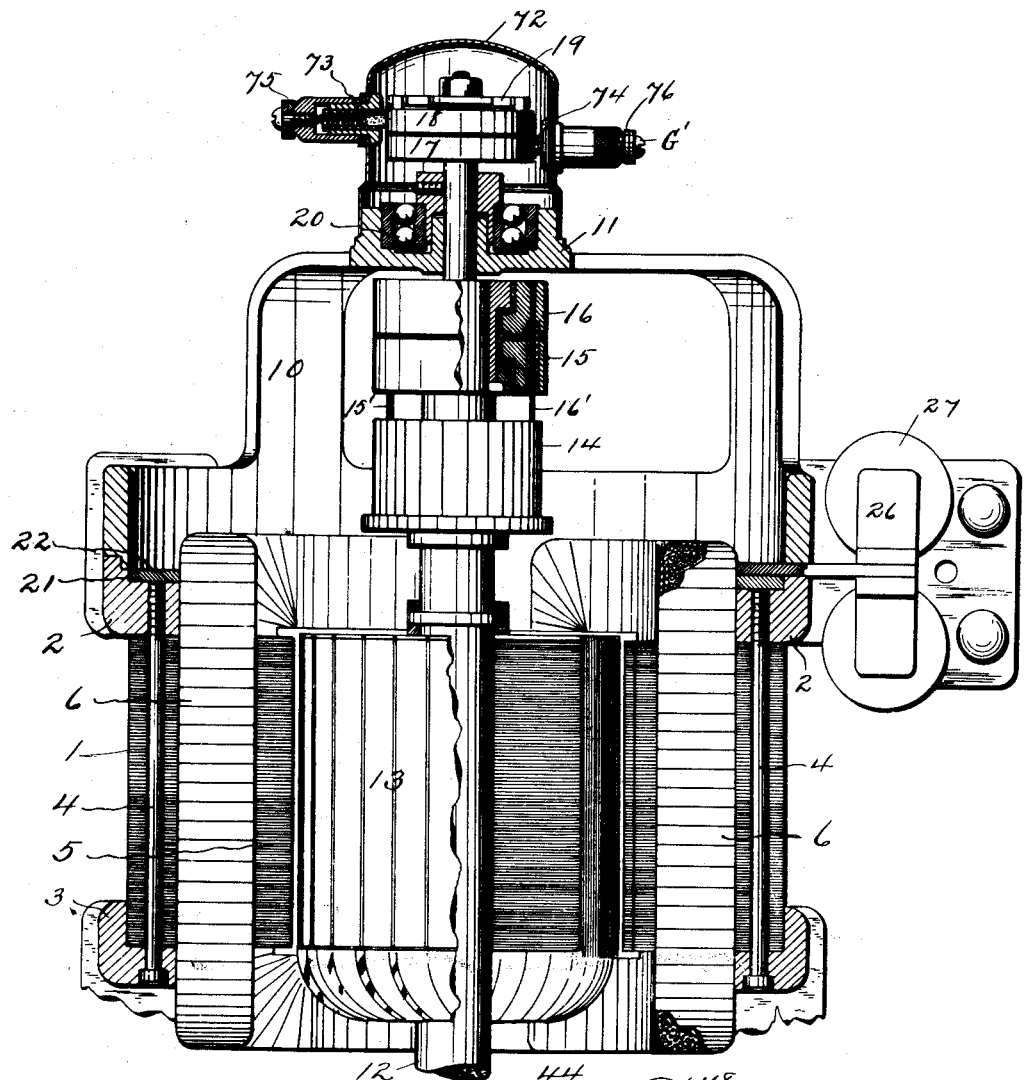
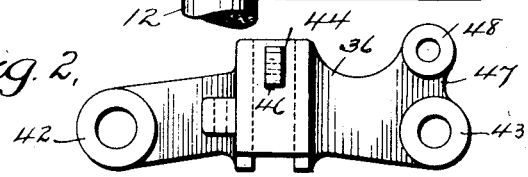
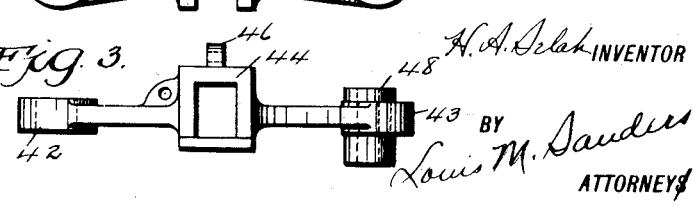
WITNESSES
H. A. Selah INVENTOR
BY
Louis M. Sanders
ATTORNEYS

H. A. SELAH.
ALTERNATING CURRENT RECTIFIER.
APPLICATION FILED MAR. 29, 1915.

1,256,063.

Patented Feb. 12, 1918.
6 SHEETS—SHEET 2.

WITNESSES

Geo. A. Senior

H. A. Selah, INVENTOR

BY

Louis M. Sanders, ATTORNEYS

H. A. SELAH.
ALTERNATING CURRENT RECTIFIER.
APPLICATION FILED MAR. 29, 1915.

1,256,063.

Patented Feb. 12, 1918.
6 SHEETS—SHEET 3.

H. A. Selah INVENTOR.

BY

Louis M. Sanders ATTORNEYS.

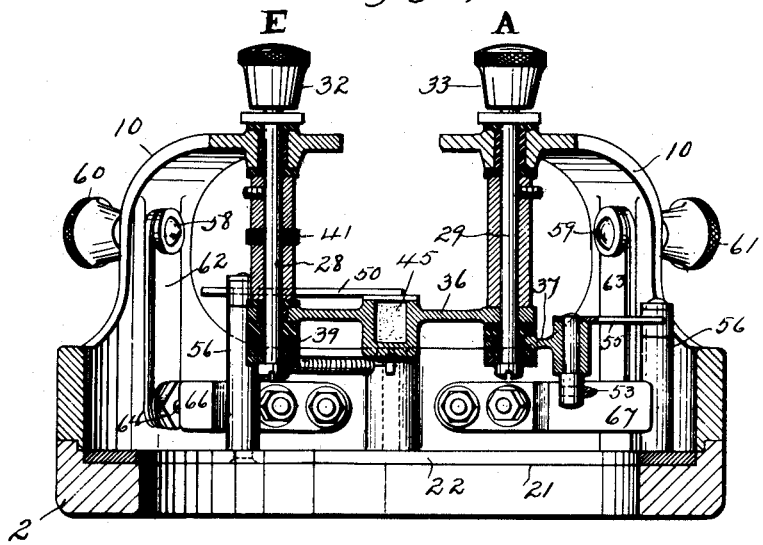
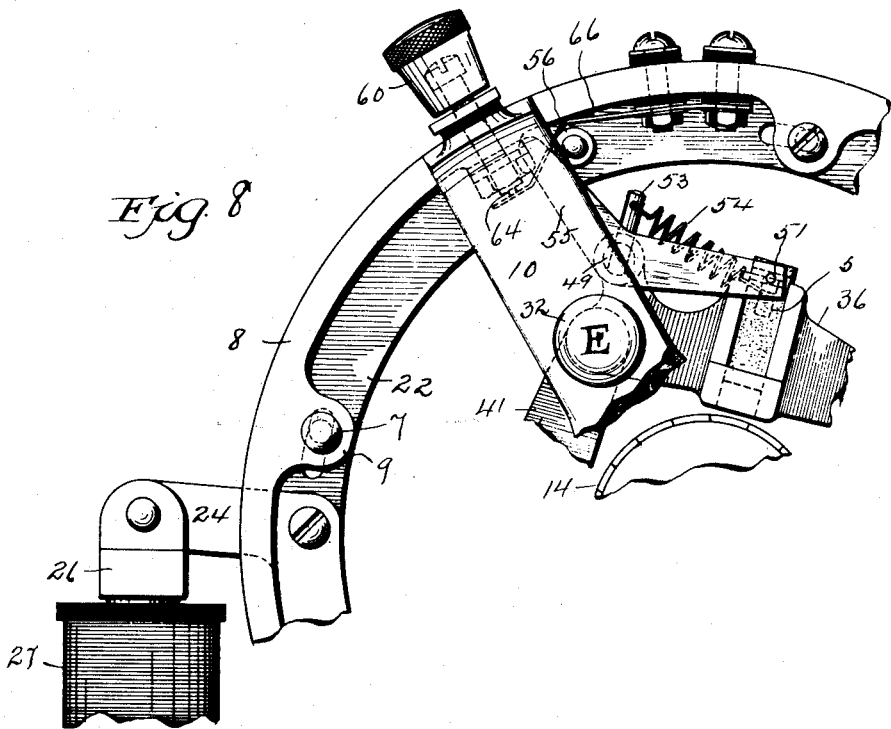

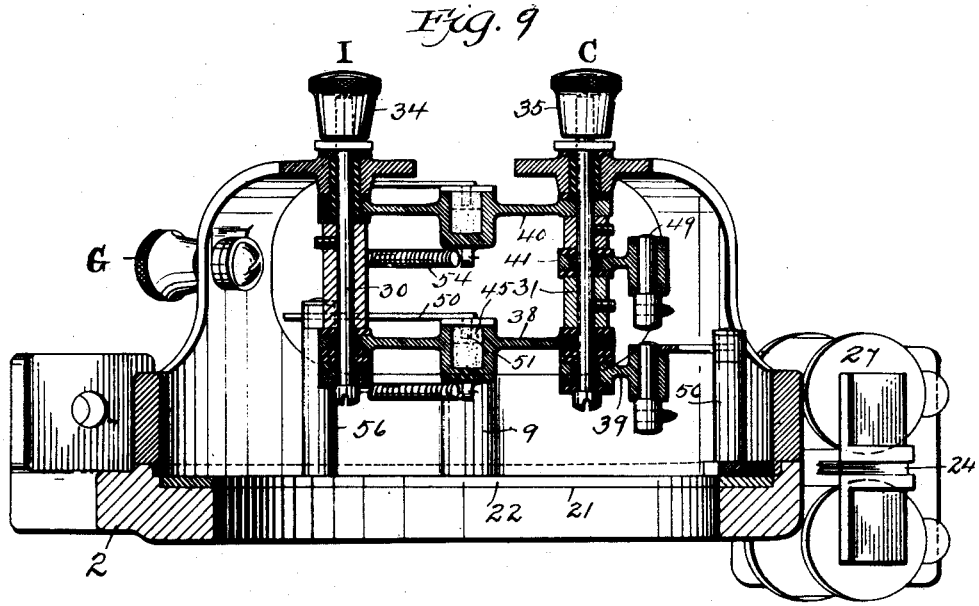

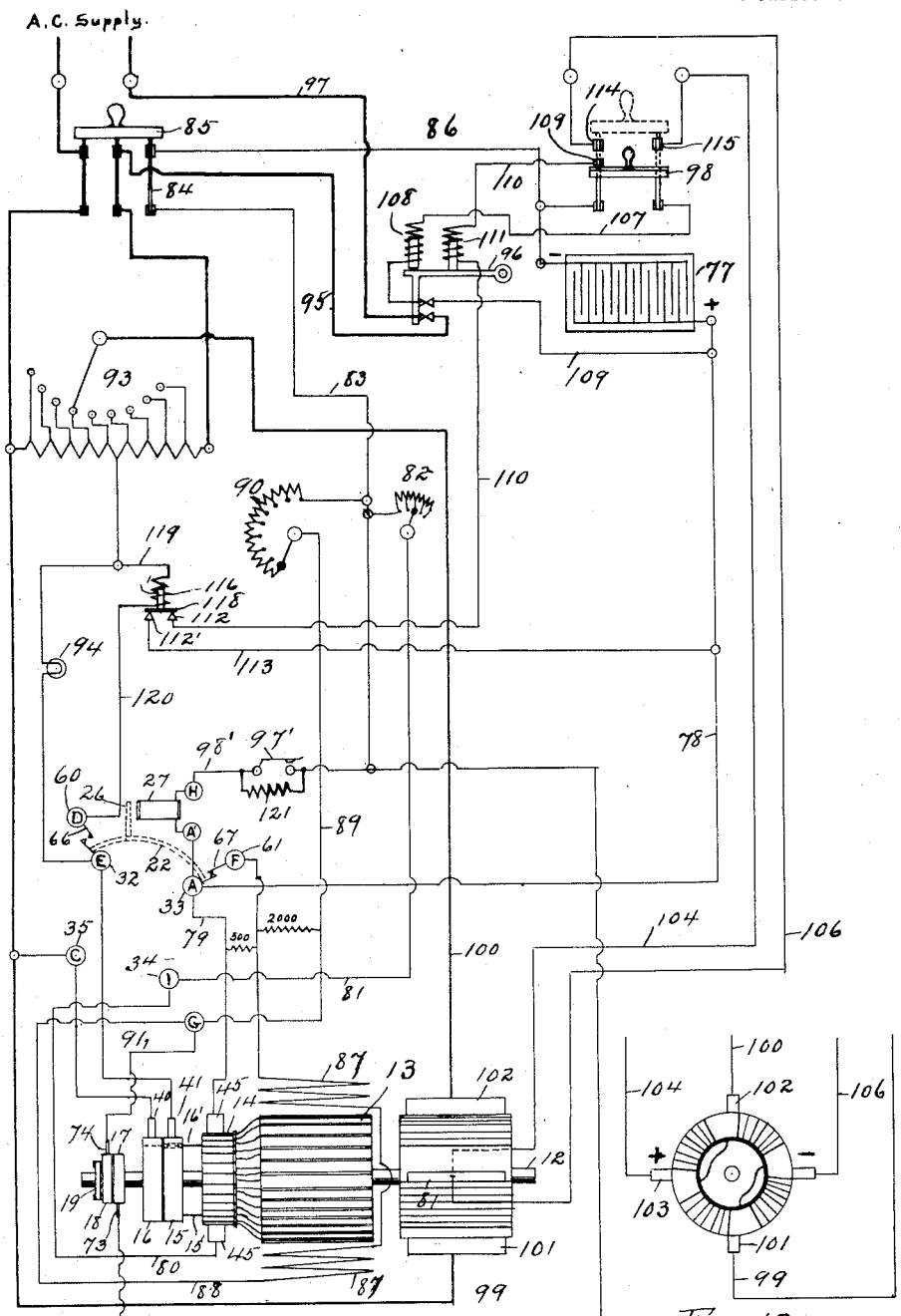

UNITED STATES PATENT OFFICE.

HOWARD A. SELAH, OF NEWARK, NEW JERSEY, ASSIGNOR TO STANDARD METAL MANUFACTURING COMPANY, OF NEWARK, NEW JERSEY, A CORPORATION OF NEW JERSEY.

ALTERNATING-CURRENT RECTIFIER.

1,256,063.  Specification of Letters Patent.  Patented Feb. 12, 1918.

Application filed March 29, 1915. Serial No. 17,733.

*To all whom it may concern:*

Be it known that I, HOWARD A. SELAH, a citizen of the United States, residing in the city of Newark, county of Essex, and State of New Jersey, have invented certain new and useful Improvements in Alternating-Current Rectifiers, of which the following is a specification.

In my prior patent application, Ser. No. 851,511 filed July 17th, 1914, I have shown a complete rectifier system in which I make use of a synchronous motor whose field magnets are initially excited by the residual current in a storage battery to be charged, and the armature thereof brought to a speed in synchronism with the alternating current generator, at which point, mechanism as described, is utilized for cutting off the battery current from the motor armature and cutting in the alternating current from the generator, and thereafter running the motor as a synchronous motor in step with the frequency of the alternating current generator. In said prior application, the A. C. brushes bear upon a pair of A. C. collector rings, and the D. C. brushes bear upon the D. C. commutator at all times.

The fact that the D. C. brushes in my former construction bear at all times upon the D. C. commutator, is open to three different objections; for example,—the armature of the motor is made up of a plurality of coils wound upon the armature core; each coil is connected separately with a segment of the commutator, and the brushes, as they bear upon the commutator, cover the face of at least two segments and usually a trifle more, so that with the commutator rotating beneath the brushes, each brush will span or contact at least two commutator segments, thus short circuiting one of the armature coils. In a twenty-four coil armature rotating within a four pole field, the four brushes short circuit at least four of the coils leaving only twenty active coils. Another objection resides in the fact that the friction between the brushes and the commutator constitutes an unnecessary load upon the motor when it is running as a synchronous motor. A third objection resides in the fact that the friction between the brushes and the commutator results in undue and unnecessary wear upon both brushes and commutator. My present application, therefore, relates to improvements in the brush holder mechanism whereby at the moment of synchronism such mechanism is actuated to lift the D. C. brushes from the commutator and simultaneously short circuit the synchronizing relay, or synchronizing lamp, as the case may be, or any device by which the synchronism of the motor with the generator is indicated, so that thereafter the motor runs in exact synchronism; at the same time the motor is relieved of the drag due to the friction between the D. C. brushes and commutator, and more important still the rendering of all the armature coils active. The mechanism also acts as a switch to disconnect the D. C. brushes from the comutator simultaneously with the short circuiting of the synchronizing lamp and the separation of certain contacts to cut in a suitable resistance into the motor field, and thereby prevent the motor from hunting. As another improvement I have shown a form of governor mechanism for opening and closing certain circuits upon certain contingencies.

In the accompanying drawings forming a part of this specification—

Figure 1, is a sectional view showing the general arrangement of the synchronous motor omitting the brush holders and other mechanism appertaining thereto for the purpose of clearness.

Fig. 2, is an under plan, and

Fig. 3, is a side elevation of one of the brush holders.

Fig. 7, is a cross-sectional view on line 7—7 of Fig. 4.

Fig. 8, is a detailed elevation showing the means for lifting the D. C. brushes from the commutator.

Fig. 9, is a cross-sectional view on line 9—9 of Fig. 4, showing the brush holder supports.

Fig. 10, is a plan view of the governor and top collector ring.

Fig. 11, is a cross-section taken on line 11—11 of Fig. 10.

Fig. 12, illustrates the wiring diagram.

Figure 4:
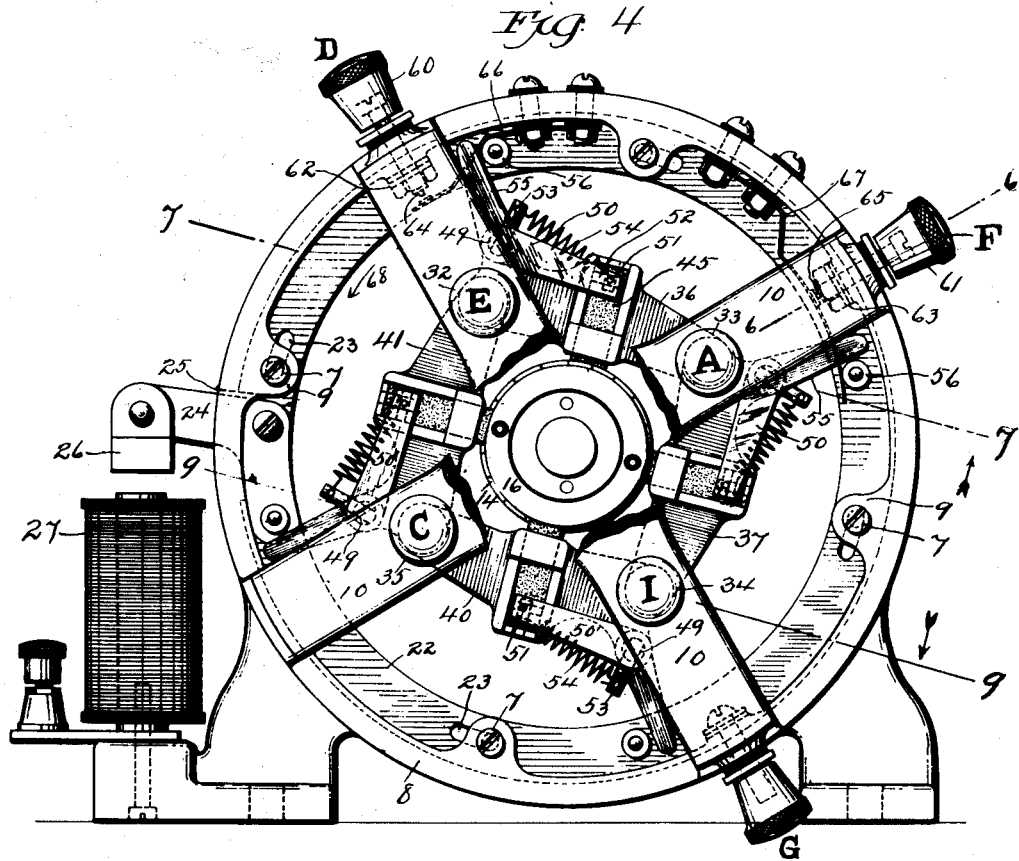
Fig. 4, is an end elevation of the motor with certain parts broken away for clearness.
Figure 6:
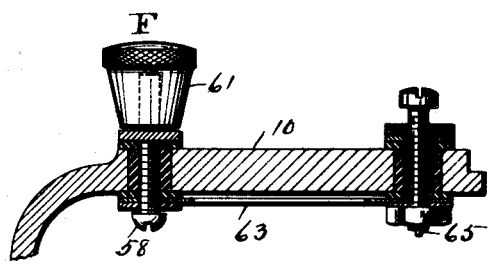
Fig. 6, is an enlarged detailed sectional view on line 6—6 of Fig. 4.

Fig. 13, is an end view of the rectifying commutator showing the location of the A. C. and D. C. brushes.

Similar letters of reference refer to like parts throughout the specification and drawings.

In Fig. 1, I have shown the vertical general plan of the synchronous motor in which the field 1, is made up of a series of sheet metal rings held together between the head rings 2 and 3, by means of the bolts 4—4, which pass through apertures in the ring 3, and field 1, and are screwed into the head ring 2, as shown. The inwardly projecting field poles 5, are surrounded by the field coils 6. Secured to the head ring 2, by means of a plurality of bolts 7, is a circular supporting frame 8, the bolts 7 passing through apertured lugs 9, integral with the frame 8, and screwed into the head ring 2. Projecting upwardly from the frame 8, are the four supporting arms 10, which unite at the center to form a bearing 11, for the upper end of the vertical armature shaft 12. Mounted upon the armature shaft are the armature and coils 13, of any usual or preferred construction, the commutator 14, the collector rings 15 and 16, the slip rings 17 and 18, of the governor 19. If desired, I may provide a ball bearing 20 for the upper end of the armature shaft, and a similar ball bearing, (not shown) for the lower end.

I have not deemed it necessary for the purpose of this application, to illustrate or describe in detail, the A. C. pole changing commutator, which is also mounted on the lower end of the commutator shaft 12. The details of such a commutator are clearly set forth in my above named prior application and also in a later application Ser. No. 869,431, filed October 30th, 1914.

The upper ring 2, is provided with a circular recess 21, in which the ring 22 is located. This ring is provided with four slots 23, through which the connecting bolts 7 pass. The ring 22 is therefore permitting a circular motion within the recess 21, to the extent of the length of the slots 23. Rigidly secured to the ring 22, at one side, as shown in Fig. 4, is the arm 24, projecting through an opening 25 between the ring 2 and the frame 8. At the outer extremity of the arm 24, is pivotally secured the armature 26, in position to be actuated by the electromagnet 27, when the same is energized. When the armature 26 is attracted to the poles of the magnet 27, it will be readily seen that the ring 22 is given a slight circular motion within the recess 21.

Figure 5:
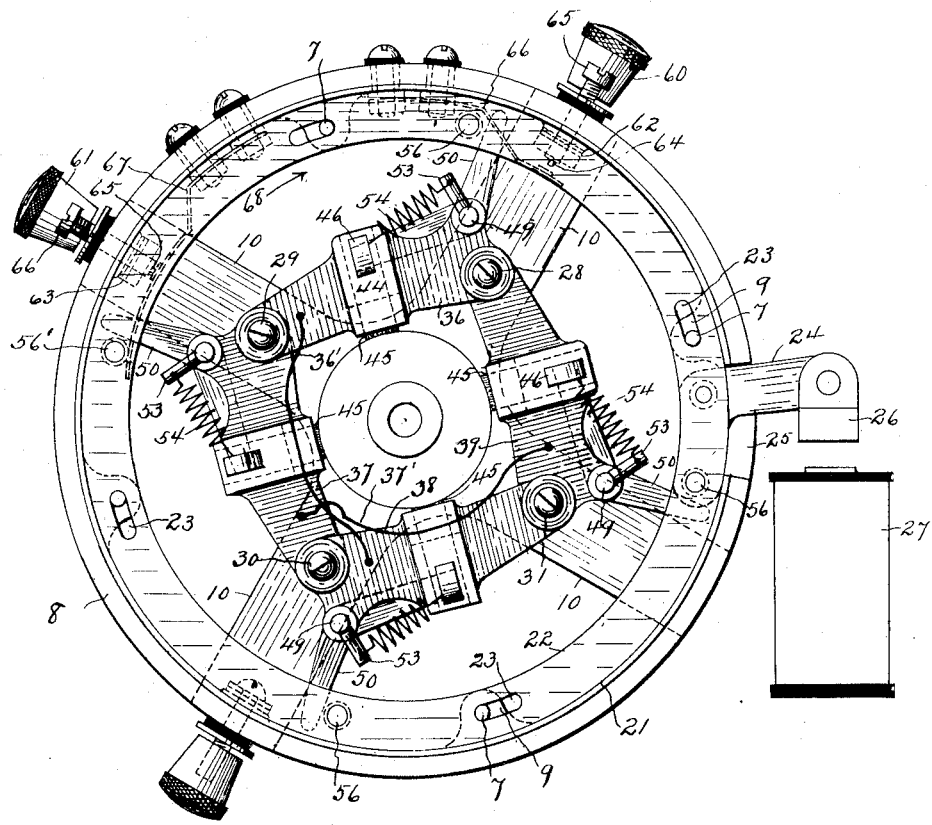
Fig. 5, is an under side view of the brush holders and supporting frame.

Extending vertically downward from the four inwardly projecting arms 10, are the four brush holder supports as illustrated in Figs. 5, 7 and 9. These brush holder supports consist of the bolts 28, 29, 30 and 31, rigidly mounted in the arms 10, and insulated therefrom, as clearly illustrated in Figs. 7 and 9. The outer ends of said bolts are provided with the binding screw caps 32, 33, 34 and 35, by means of which circuit connections are secured to the four bolts 28 to 31 inclusive. In practice these caps are lettered respectively as shown, viz. E, A, I, and C, to correspond with the wiring diagram and to facilitate assembling and wiring.

Spanning from the adjacent pairs of bolts are the four D. C. brush holders 36, 37, 38 and 39, and the two A. C. brush holders 40 and 41. The D. C. brush holders 36, 37, 38 and 39 are mounted upon the lower extremities of the bolts 28 to 31 inclusive, in position to permit the brushes, hereinafter referred to, to bear upon the commutator 14, while the A. C. brush holders 40 and 41 are mounted upon the corresponding bolts 28, 30 and 31, in position to permit their brushes to bear upon the respective collector rings 15 and 16.

The details of the brush holders, both A. C. and D. C., are all the same and illustrated in Figs. 2 and 3, and the description of one will suffice for all. They consist of a casting 36, provided with apertured bosses 42 and 43, at the ends to receive the supporting bolts 28 to 31 respectively. Midway between the ends of the casting 36, a square socket 44 is provided, into which is inserted the brush 45; one side of the square socket is cut away as shown in Fig. 4, to permit the brush lifting mechanism (hereafter to be described), to be connected to the respective brushes. The closed side of the socket 44, has upon its outside, an apertured lug 46. At the side of the apertured boss 43 is a lateral extension 47, upon which is provided an apertured boss 48, in which is mounted a rock-shaft 49 which extends both above and below the extremities of the boss 48. Secured to the upper end of the rock-shaft 49, of the D. C. brush holders, is a bell crank 50 one end of which extends forward to the side of the brush 45, and has a lateral pin or projection 51 extending into a corresponding slot 52, in the side of the brush 45. At the lower end of the rock-shaft 49 is an outwardly extending pin or arm 53, from which extends the spring 54 to connect with the apertured boss 46, upon the lower side of the brush holder. The tendency of this spring 54, is to oscillate the rock-shaft and with it the bell crank 50, so as to press the brush 45 against the commutator 14. The other arm 55 of the bell crank 50, projects outwardly into the path of an upstanding stud 56, rigidly mounted upon the synchronizing ring 22. It is to be understood that each of the D. C. brushes is provided with a bell crank lever of the form just described, so that when the magnet 27 is moved in such a manner as to bring the upstanding studs 56 into contact with the outwardly projecting arms 55, and thereby the brushes 45 are lifted away from contact with the commutator 14, as shown in Fig. 8. When, however, the magnet 27 is deënergized, the combined strength of the four springs 54, acting through the arms 55, upon the studs 56, serve to restore the synchronizing ring 22 to the position illustrated in Fig. 4, in which position the D. C. brushes bear upon the commutator 14.

Inasmuch as there is no necessity for lifting the A. C. collector brushes from the two collector rings 15 and 16, these brushes need not be provided with the arms 55, but only with the other mechanism described, including the rock-shaft 49, the arm 50', the pin 51, arm 53 and spring 54. In other respects the A. C. brush holders and accompanying parts are identical with the D. C. brush holders.

As shown in Fig. 7, the brush holder 36 is in metallic connection with the bolt 29, which in turn is connected through the cap 33, with the direct current supply. The opposite brush holder 38 is connected to the brush 36 by means of a wire 36', the ends of which are soldered into small apertures provided therefor in the brush holders 36 and 38, as clearly shown in Fig. 5. Since the two brush holders 36 and 38 carry current of the same polarity, it is unnecessary for more than one of these two brush holders to be connected to the D. C. supply, since this wire connection between the two brush holders serves the purpose of uniting the two brush holders 36 and 38 with the D. C. supply. The brush holder 38, therefore, as shown in Fig. 9, is completely insulated from the two supporting bolts 30 and 31. The two brush holders 37 and 39 are the negative brush holders and are similarly connected together by means of the connecting wire 37'. For the same reason it is only necessary to connect one of these brush holders with the negative side of the D. C. supply, and as shown in Fig. 9, the brush holder 37 is in metallic connection with the supporting bolt 30, while the brush holder 39 is insulated from the support 31. The A. C. brush holders 40 and 41, are similarly supported upon the four bolts 28 to 31 inclusive, but since the two bolts 28 and 31 are connected with the A. C. supply, it is necessary to connect one of the A. C. brush holders with one of these bolts, and the other with the other bolt, as shown in Figs. 7 and 9. The brush holder 40, is in metallic connection with the bolt 31, and insulated from the bolt 31 which supports its opposite end, while the bolt 28 supports one end of, and is in metallic connection with the brush holder 41, and its opposite end is supported by, and insulated from the bolt 31. Thus the six brush holders illustrated, are all supported from the said set of four bolts and the oscillation of the synchronous ring 22 serves to lift the D. C. brush holders from the commutator.

Referring to Figs. 4, 5, 6 and 7, it will be noted that two binding screws 58 and 59 are mounted upon, but insulated from the two arms 10, and provided with the screw caps 60 and 61. From beneath the head of, and in metallic contact with each of the binding screws 58 and 59, extend the metallic connectors 62 and 63, which are secured to the adjustable contact points 64 and 65, which latter are supported by but insulated from the ring 8, as clearly shown in Fig. 6. Secured to the inner side of, but insulated from the ring 8, are the two cam springs 66 and 67, in position to bear upon the contact points 64 and 65 respectively. The cam spring 66 is provided with a bend adjacent to the post 56, which as hitherto described is mounted upon the ring 22. The normal tendency of the spring 66 is away from the contact point 64, but when the post 56 bears upon the cam bend of the spring 66, due to the oscillation of the ring 22, in the direction of the arrow 68, the post 56 will cause the spring 66 to bear with its extreme end upon the contact point 64, thus closing a circuit between the binding screw 58 and the spring 66 for a purpose hereinafter to be described. Simultaneously with the oscillation of the ring 22, the other post 56' will bear upon the extreme end of the spring 67, whose tendency is to cause it to contact with the contact point 65, and lift said contact and separate said spring from the contact 65. It will thus be seen that with the synchronizing ring in the position indicated in Fig. 4, the circuit through the binding screw 59 is closed, but when the magnet 27 is energized and the ring 22 oscillated into the position indicated in Fig. 8, the circuit is closed between the contact point 64 and the spring 66, while the circuit between the contact spring 67 and the contact point 65 is broken. Thus the oscillation of the ring 22, in addition to raising and lowering the D. C. brushes from, and upon the commutator 14, alternately closes and breaks the circuit at the spring 66, and the binding screw 58, and alternately breaks and closes the circuit between the contact spring 67 and binding screw 59.

In Fig. 1, I have shown the construction of the two A. C. collector rings 15 and 16. These collector rings are mounted upon but insulated from the armature shaft 12, in any convenient or desired manner. The collector ring 16, being uppermost, is provided with a metallic connection 16', with the commutator 14 upon the one side. Such metallic connector 16', in the present case, consists of a wire in metallic connection with the ring 16, and passing through and insulated from the ring 15. Upon the other side, and diametrically opposite is the metallic connection 15' connecting the ring 15 with the commutator 14. Thus the two rings 15 and 16 are respectively in metallic connection with the commutator 14 at diametrically opposite points in the same manner as the corresponding points are shown and described in my prior application Ser. No. 851,511, above referred to.

The governor, as hitherto described, consists of the two slip rings 17 and 18 mounted upon, but insulated from the armature shaft 12. Upon the uppermost 18, of these rings is mounted a post 69, split at its upper end to receive the governor spring 19. This spring is bent in semi-circular form and has at its opposite free end, a contact point 70 for metallic contact with a metallic adjusting screw 71 which passes through the post 71', which passes through and is insulated from the slip ring 18, but is in metallic connection with the slip ring 17. The normal tension of the spring 19 is such as to close the contact between the point 70 and screw 71, when the rotation of the armature shaft falls below a certain speed. When, however, the speed of the armature shaft passes a certain predetermined point, the centrifugal force will cause the spring 19 to fly away from the center of rotation and thus break the contact between the point 70 and screw 71.

Mounted upon the boss 11, surrounding the upper bearing of the armature shaft, is a metallic cap 72, which incloses the governor mechanism. Projecting through diametrically opposite points in the cap 72 are the two collector brushes 73 and 74, insulated from said cap in any desired or preferred manner. These brushes are in metallic connection with binding screws 75 and 76 upon the outside of the cap 72. The two brushes 73 and 74 bear respectively upon the slip rings 18 and 17, and in this manner current may enter through the binding post 75, pass to the brush 73; thence to the ring 18; thence by way of the spring 19, to the post 71'; and to the slip ring 17; and out by the brush 74, and binding post 76; and so long as the contact between the points 70 and 71 is closed current may pass, but as above indicated, when the speed of the armature shaft 12 passes a certain point this contact is broken and the current can no longer pass as indicated.

In Fig. 12, I have shown diagrammatically the circuits which operate and which are operated by the mechanism hitherto described. In this figure the armature shaft 12 is shown as carrying the armature 13, the coils of which are connected respectively to the segments of the commutator 14; the two collector rings 15 and 16, and the slip rings 17 and 18 of the governor 19. Let it be assumed that the storage battery 77 is to be charged; such batteries always have more or less residual current, and I utilize such current to start the motor and speed the same up into synchronism with the generator, which supplies the current to be rectified. Following the path of such current through the motor, starting from the positive side of the battery, it will be noted that a wire 78 connects with the binding post 33, which bears the letter A; thence a wire 79 leads to one of the brushes 45; thence by way of the segments of the commutator 14 to the armature 13; thence back to the commutator 14; through the other brush 45, and thence by wire 80 to the binding post 34, which is lettered I; thence by wire 81 through the current regulator 82, and by way of the wire 83 back to the right-hand blade 84, of the three-bladed starting switch 85, which is understood to be closed in starting. The circuit continuous back to the negative side of the battery 77, by way of wire 86. Between the binding posts 33, (A) and 61 (F), the switch 67 is interposed. This switch is closed. The circuit from the positive side of the battery leads by way of the switch 67, through the field coils 87 of the motor, and back through the wire 88 leading to the binding post G. The circuit, however, is divided, one branch leading by way of the binding post G, through wire 89 and the rheostat 90, to the return wire 83, through the D. C. blade 84, of the switch 85, and by wire 86 to the negative side of the battery. The other branch of this circuit leads by wire 91, to the brush 74 of the governor 19; thence through the slip ring 17, and by way of the connection hitherto described, to the ring 18; thence to the brush 73, and thence through the return wire 92 to the negative side of the battery 77. With the starting switch 85 closed, it will be noted that both armature and field coils of the motor are energized and the motor is started as a D. C. motor, the rheostat being thrown to its greatest resistance so that the fields 87 are supplied mainly by current through the governor 19. By this means I am enabled to start the motor with a comparatively strong field regardless of the position of the rheostat 90, thus preventing the motor from starting with a weak field which is always detrimental; but as the motor speeds up the governor operates to open the circuit therethrough, and thereafter the fields 86 are energized only by current supplied through the rheostat 90. Through the manipulation of the rheostat 90, by which the strength of the fields 86 are governed, the speed of the motor may be brought up into synchronism with the generator which supplies the alternating current to be rectified. As above indicated, the switch 85 is a three-bladed switch, one blade 84, of which serves as a switch for the direct current, and the other two blades carry alternating current. The circuit from the alternating current supply passes through the left-hand blade of the switch to the binding post 35, which is lettered C, thence it passes to the brush 40, which bears upon the collector ring 16; thence by way of the connecting wire 16′ to the commutator, and thence through the coils of the armature 13, and back by way of the commutator 14; wire 15′; and the collector ring 15; thence by way of the brush 41, to the binding post 32 (E), from which a wire leads to a section of the auto-transformer 93, such section being arbitrarily chosen to carry current of a predetermined voltage. In this wire, leading from the binding post 32, to the auto-transformer 93, is located what I term the synchronizing lamp 94. The circuit is completed through the remaining sections of the auto-transformer 93, to the middle blade of the switch 85, and thence by wire 95 through the overload circuit breaker 96, and wire 97, to the alternating current supply. The interposing of the lamp 94, in this circuit, throws a considerable resistance and serves in a measure as a buffer for the comparatively heavy alternating current which would otherwise pass through the armature.

While the motor is running as a D. C. motor, it is at the same time sending a counter-alternating current to the collector rings 15 and 16, but the frequency of such current varies and is considerably less at the start than the frequency of the alternating current supply. This results in causing the lamp 94 to fluctuate in accordance with the meeting of the waves of the two counter-currents. When a positive wave from the armature 13 meets the crest of a positive wave from the A. C. supply the lamp 94 will go out, and when these two meeting waves are of opposite polarity the lamp 94 will be lighted. The frequency of these fluctuations will depend upon the rapidity of these variations between the two currents, but there comes a time as the armature 13 is speeded up, when the two frequencies will coincide, with the result that the lamp 94 will remain extinguished, at which time the motor is in exact synchronism with the generator. The lamp 94, therefore, becomes an index to signify to the operator the moment when the switch or push button 97′, in the wire 98′, should be closed. Upon the closing of the push button 97′, current from the positive side of the battery will pass by way of the binding post 33 (A), to the magnet 27, which upon reference to Figs. 4 and 8, and as hitherto described, will cause the following things to take place. First, the synchronizing ring 22, is rotated, and by such rotation the brushes 45 are lifted from the commutator 14, and simultaneously the switch 67 is opened, and the switch 66 is closed. The opening of the switch 67 simultaneously throws into the field of the motor, the extra resistance marked "500," which indicates 500 ohms of resistance thrown into the field coils in addition to the resistance of the rheostat 90. The closing of the switch 66, due to the rotation of the ring 22, short circuits the lamp 94, and permits the full strength of the alternating current to pass through the pre-determined coil of the auto-transformer 93, so that a pre-determined current is sent through the armature 13, which thereafter runs as a synchronous motor, whose field, up to the present time, is excited by the battery 77.

If, now, the switch 98 is closed, current from the A. C. supply will pass by way of the auto-transformer 93, wires 99 and 100, to the rectifier commutator brushes 101 and 102, and since said commutator is mounted upon the shaft 12, and rotated along with the armature 13, the alternating current will be rectified and the positive brush 103, will be connected through wire 104, by the positive blade of the switch with the positive side of the battery 77, by wire 107, through the coil 108 of the overload circuit breaker 96, and wire 109, and the negative brush 105 will be connected by wire 106, with the negative side of the battery 77. It will be noted now, that the field coils of the motor are excited with rectified direct current from the rectifier, while the battery 77 is bridged across the positive and negative wires 78 and 86, leading to the field coils of the motor. As a precaution against puncturing of the fields by the sudden opening of the circuit leading to the field coils, through the binding caps F and G, I bridge across the wires leading to the caps F and G, a very large resistance, say about 2000 ohms, as indicated in the figure. Thus the sudden opening of the circuit, supplying the field coils, will not cause a burning out, either of the armature, or the coils.

In devices of the character described, where currents of considerable strength are to be handled, it is necessary for the preservation of the parts to introduce certain safety devices,—as for example, the overload circuit breaker 96, with its coil 108 in the circuit. In the present case an overload through the coil 108 will break both the circuit through wires 95 and 97, which carry alternating current, and also the circuit through wires 107 and 109 which carry direct current, and when these circuits are broken the entire mechanism comes to a standstill and cannot be started until the overload circuit breaker 96 is again closed.

As a further safety device for the mechanism, I provide a supplementary jaw 109, in position for engagement with the left-hand blade of the charging switch 98, and lead a wire 110 therefrom, through a trip coil 111, to a contact point 112, completing the circuit from contact 112' by wire 113, to the positive battery wire 78. I make the jaw 109, and the jaw 114 of the switch 98, somewhat higher than the positive jaw 115 of said switch, so that when closing the left-hand blade of the switch will engage the jaws 109 and 114, before the right-hand blade engages the jaw 115, the object being to energize the coil 111, and thereby open the circuit breaker 96, should the charging switch 98 be closed before the motor has been synchronized. The trip coil relay 116, has upon the bottom of its core 117, a metallic plate 118 which spans across the two contact points 112 and 112', and when the trip coil is not energized the circuit between the wires 110 and 113 is closed, and any attempt to close the starting switch 98 will serve to open the overload circuit breaker 96, and thus stop the motor. The trip coil relay 116 is located in the circuit comprising the wire 119, which is tapped into the auto-transformer 93, and connects with the wire 120, which as hitherto described is tapped into a coil of the auto-transformer 93, at a point to send a pre-determined voltage either through the synchronizing lamp 94, and the collector rings 15 and 16, or directly through the wire 120 to the binding cap 60 (D). It will be remembered that the switch 66 is not closed until such time as the motor is synchronized, therefore the trip coil relay 116 will not be energized and the metallic plate upon the lower end of the core 117 will rest upon the two contact points 112 and 112'; therefore, any attempt to close the switch 98 will, as above described, cause the trip coil 111 to be energized and thus open the overload circuit breaker 96; but after synchronizing the motor, the trip coil relay is energized and the circuit closer 118 is open, and then the starting switch 98 may be closed without fear of opening the overload circuit breaker 96.

The synchronizing lamp 94, not only acts as a resistance helping the motor to fall into step, but also as a signal showing that the motor is running in synchronism with the A. C. supply.

The cycle of operation of the system is as follows. With the storage battery 77 in circuit as shown, the starting switch 85 is closed, current from the battery 77 is delivered through the circuits, as hitherto described, to the fields 87, and to the coils of the armature 13, thereby starting the motor as a D. C. motor. Simultaneously with the closing of the starting switch, current is delivered to the two collector rings 15 and 16, but alternating current is also delivered through the connecting wires 15' and 16', from the armature 13. This current opposes the A. C. supply through the lamp 94, so it is clear that when the speed of the motor is adjusted by means of the resistance of the rheostat 90, so as to deliver an alternating current of a frequency corresponding to that of the A. C. supply, the synchronizing lamp 94 will be dead out. At this point, the operator presses the button 97', thereby increasing the magnetic density of the magnet 27, by short circuiting the resistance 121, which in turn operates the synchronizing ring 22, to open switch 67 and close switch 66; but the closing of switch 66 short circuits the synchronizing lamp 94 and thereafter the motor, as hitherto described, runs as a synchronous motor in exact step with the frequency of the alternating current generator. The opening of the switch 67 cuts in the resistance of 500 ohms between the wire 79 and the field coil wire, and therefore direct current from the battery 77 is supplied to the field coils 87. The operator then may close the charging switch 98 and thereafter the main A. C. current delivered to the rectifying commutator will be rectified and sent as direct current through the course as hitherto described, to charge the battery 77.

It may be stated at this point, that the magnet 27 is energized at all times when the battery 77 is in circuit, but because of the resistance 122, interposed in the circuit, the magnetic density of the magnet 27 is insufficient to attract the armature 26 and thereby operate the synchronizing ring 22. The spring switch, or push button 97', however, is interposed in the circuit so as to temporarily short circuit the resistance 121. This will result in so increasing the magnetic density of the magnet 27 so as to attract its armature 26 and thereby operate the parts connected therewith; the push button 97' may then be released, thereby cutting in the resistance 121. The magnet 27 will then have sufficient density to hold the armature 26 against its pole, although it would be insufficient to attract it were the contact point broken.

Other minor safety devices, as fuses interposed in the main A. C. circuit and also in the battery circuit are used in practice, but their locations are such as to readily suggest themselves to those familiar with the handling of electrical devices, and it is not thought necessary to more specifically illustrate and describe them.

In Fig. 13, I have shown diagrammatically the rectifying commutator and the location of the brushes substantially the same as in my prior application Ser. No. 869,431.

I claim:

1. In an alternating current rectifier system, the combination of a synchronous motor having field magnets, and the armature thereof, with a rectifying commutator, a D. C. commutator and alternating current collector rings rigidly secured to rotate with said armature, a storage battery to be charged having circuit connections for supplying direct current to said field magnets and to said D. C. commutator whereby said motor may be started and run as a D. C. motor, a source of alternating current having circuit connections with said collector rings and said armature, a set of collector brushes bearing upon said collector rings, and a set of collector brushes bearing upon said direct current commutator, and magnetic means actuated by current from said battery circuit for lifting said direct current collector brushes from the direct current commutator.

2. In an alternating current rectifier system, the combination of a synchronous motor having field magnets and the armature thereof, with a rectifying commutator, a D. C. commutator, A. C. collector rings rigidly secured to rotate with said armature, a storage battery to be charged having circuit connections for supplying direct current to said D. C. commutator, whereby said motor may be started and run as a D. C. motor, a source of alternating current having circuit connections with said collector rings and with said armature, a synchronizing indicator in said circuit for indicating the synchronism of the motor with the generator which supplies the alternating current, and means actuated by current from said storage battery for simultaneously lifting the D. C. brushes from the D. C. commutator at the moment synchronism is indicated by said indicator.

3. In an alternating current rectifier system, the combination of a synchronous motor provided with field magnets and an armature, means for exciting said field magnets with direct current and for alternately exciting said armature with direct current and with alternating current, comprising a D. C. commutator and A. C. collector rings mounted to rotate with said armature and separately connected with the coils thereof through said commutator, D. C. collector brushes bearing upon said commutator, and means actuated by current from the D. C. supply for lifting said current brushes from said D. C. commutator whereby said motor may thereafter run as an A. C. motor.

4. In an alternating current rectifier system, the combination of a synchronous motor provided with field magnets and an armature, of a D. C. commutator and A. C. collector rings rigidly secured to rotate with said armature, a source of A. C. supply connected to said collector rings respectively and a source of D. C. supply to said field magnets and armature whereby said motor may be started as a D. C. motor, and collector brushes in said D. C. supply bearing upon said commutator, and means actuated from said D. C. supply for lifting said brushes from the D. C. commutator.

5. In an alternating current rectifier system, the combination of a synchronous motor provided with field magnets and an armature thereof, of a pair of A. C. collector rings and a D. C. commutator secured to the shaft of said armature to rotate therewith, a source of A. C. supply and a source of D. C. supply, collector brushes connecting said A. C. supply with said collector rings and a plurality of brushes connecting said D. C. supply with said commutator, and electromagnetic means actuated by said direct current for lifting said D. C. brushes from their commutator.

6. In an alternating current rectifier system, the combination of a synchronous motor having field magnets and an armature, a D. C. commutator, and A. C. collector rings secured to the shaft of said armature to rotate therewith, A. C. and D. C. sources of supply, metallic connections respectively between said collector rings and said commutator whereby a counter alternating current may be delivered from said armature to said collector rings when said motor is running as a D. C. motor, D. C. brushes connecting said D. C. supply with said commutator, and an electromagnet actuated by the direct current for lifting said commutator brushes from the commutator.

7. In an alternating current rectifier system, the combination of a synchronous motor having field magnets and an armature with a D. C. commutator and A. C. collector rings rigidly mounted upon the shaft of said armature to rotate therewith, A. C. and D. C. sources of supply, metallic connections between said collector rings respectively and said commutator whereby A. C. may be delivered to said collector rings from said armature when the motor is running as a D. C. motor, a ring mounted upon said motor to oscillate about the armature shaft, means upon said ring for lifting the direct current collector brushes from the commutator, and means for oscillating said ring, said means actuated by current from the D. C. supply.

8. In an alternating current rectifier system, the combination of a synchronous motor having field magnets and an armature with a D. C. commutator and A. C. collector rings rigidly secured to rotate with said armature, an A. C. supply connected to said collector rings and a plurality of D. C. brushes bearing upon said armature, a synchronizing ring mounted upon the frame of said motor to oscillate, means connecting said synchronizing ring with said D. C. brushes respectively, and magnetic means actuated from said D. C. supply for oscillating said ring to lift said D. C. brushes from said commutator.

9. In an alternating current rectifier system, the combination of a motor having field magnets and an armature, with a commutator mounted upon the shaft of said armature, a plurality of collector brushes mounted to bear upon said commutator, a source of external direct current for supplying said field magnets and armature, and means actuated by direct current from said source for lifting said commutator brushes from commutator.

10. The combination of an electric motor provided with field magnets, an armature and a commutator, commutator brushes normally bearing upon said commutator, an external source of direct current, an oscillating ring mounted concentrically to said armature, and means actuated from said source of direct current for oscillating said ring to lift said commutator brushes from said commutator.

11. The combination of an electric motor, provided with a plurality of field magnets, an armature and a commutator, and collector brushes bearing upon said commutator, an external source of direct current, an oscillating ring mounted adjacent to and concentric with said commutator, an electromagnet in open circuit with said direct current supply for oscillating said ring, and means connected to said brushes and actuated by the oscillation of said ring for lifting said brushes from said commutator when said open circuit is closed.

12. The combination of an electric motor, provided with a plurality of field magnets, an armature, and a commutator mounted upon the shaft of said armature, collector brushes bearing upon said commutator, an oscillating ring mounted concentrically to said armature and having a plurality of studs mounted thereon, and means connected with said brushes for engagement with said studs whereby upon the oscillation of said ring said brushes are lifted from the commutator.

13. The combination of an electric motor, provided with a plurality of field magnets, an armature and a commutator mounted upon the shaft of said armature, collector brushes bearing upon said commutator, a source of direct current supply, an oscillating ring mounted concentrically to said armature and having a plurality of studs mounted thereon, means connected with said brushes for engagement with said studs whereby upon the oscillation of said ring said brushes are lifted from the commutator, an electro-magnet in circuit with said direct current supply, a magnet armature connected with said ring and located adjacent to the poles of said electro-magnet, and means for closing said open circuit whereby said magnetic armature is attracted to said magnet and said ring oscillated.

14. The combination of an electric motor, provided with a plurality of field magnets, an armature and a commutator mounted upon the shaft of said armature, collector brushes normally bearing upon said commutator, a source of direct current supply, a ring mounted concentric to said armature and having a plurality of studs mounted thereon, levers connected with said brushes for engagement with said studs whereby the oscillation of said ring in one direction will lift said brushes from the commutator, an electro-magnet in open circuit with said direct current supply, and a resistance in said direct current supply, a magnet armature connected to said ring and located adjacent to the poles of said electromagnet, and means for temporarily short circuiting said resistance whereby said magnet armature is attracted to and held by said electromagnet whereby said ring is oscillated to lift said brushes from said commutator.

15. In an alternating current rectifier system, the combination of a synchronous motor with a source of A. C. supply and a storage battery to be charged, circuit connections from said A. C. supply to the armature of said synchronous motor and circuit connections from said storage battery to the armature and the field coils of said motor, whereby said motor may be started as a direct current motor and deliver counter A. C. to said A. C. supply circuit, means for regulating the speed of said motor into synchronism with the frequency of said A. C. supply, and electro-magnetic means for opening the circuit from said storage battery to said armature whereby said motor may thereafter run as a synchronous motor.

16. In an alternating current rectifier system, the combination of a motor having field magnets, an armature, a D. C. commutator, and A. C. collector rings mounted upon the shaft of said armature, circuit connections from said A. C. supply to said A. C. collector rings and circuit connections from said storage battery to said field magnets and armature, separate connections from said collector rings to said armature whereby said motor may deliver counter A. C. to said A. C. supply circuit, means for regulating the speed of said motor into synchronism with the frequency of said A. C. supply, a synchronizing lamp in said A. C. circuit for indicating the synchronism of said motor with said A. C. supply, and an electromagnet actuated by direct current from said storage battery for opening the D. C. circuit from said storage battery to said armature at the moment synchronism is reached, whereby said motor may thereafter run as a synchronous motor in step with the frequency of said A. C. supply.

17. In an alternating current rectifier system, the combination of a synchronous motor having field magnets, an armature shaft with a D. C. commutator, A. C. collector rings, an armature and a pole changing commutator mounted thereon to rotate therewith, means for supplying direct current to the fields of said motor and to the armature thereof through said commutator, means for supplying alternating current to said armature through said collector rings, means for regulating the strength of the field magnets to vary the speed of rotation of said armature into synchronism with the frequency of said alternating current, a synchronizing lamp in the alternating current circuit for indicating by its fluctuations the synchronism of said armature with the alternating current generator, and electromagnetic means in said D. C. supply circuit for cutting off direct current from said armature and thereafter permitting said motor to run as a synchronous motor.

18. In an alternating current rectifier system, the combination of a source of A. C. supply and a storage battery to be charged, with a synchronous motor whose fields and armatures are initially excited from the residual current in said storage battery, means for regulating the current supplied to the fields of said motor whereby the speed of its armature may be varied, A. C. collector rings associated with said armature and in circuit with said A. C. supply and connected to receive a counter A. C. from said armature, means for indicating the synchronism of said motor with the frequency of said A. C. supply, and magnetic means in said D. C. supply circuit for cutting off the D. C. supply to said armature to permit said motor to run thereafter as a synchronous motor.

19. In an alternating current rectifier system, the combination of an A. C. supply and a storage battery to be charged, with a synchronous motor whose fields and armature are initially excited from the residual current of said storage battery, circuit connections from said A. C. supply to the armature of said synchronous motor, whereby said motor may deliver counter A. C. to said A. C. circuit, a synchronizing lamp in said A. C. circuit for indicating the synchronism of said motor with the frequency of the A. C. supply, an overload circuit breaker in said A. C. supply circuit, and means for actuating said overload circuit breaker to break said A. C. supply circuit governed by a condition of non-synchronism between said motor and said A. C. supply.

In testimony whereof, I have hereunto set my hand this 27 day of March, 1915.

HOWARD A. SELAH.

In presence of—
 Louis M. Sanders,
 F. L. Green.